Aug. 7, 1928.
H. C. BULLIS
MOTION PICTURE STRIP
Filed Dec. 1, 1926
1,679,708
*Fig.1.* *Fig.2.* *Fig.4.*
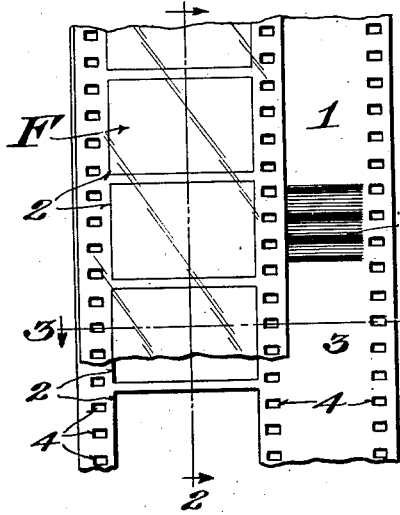 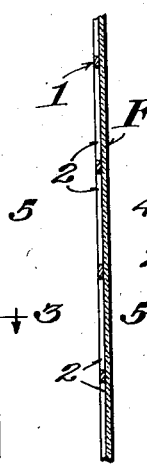 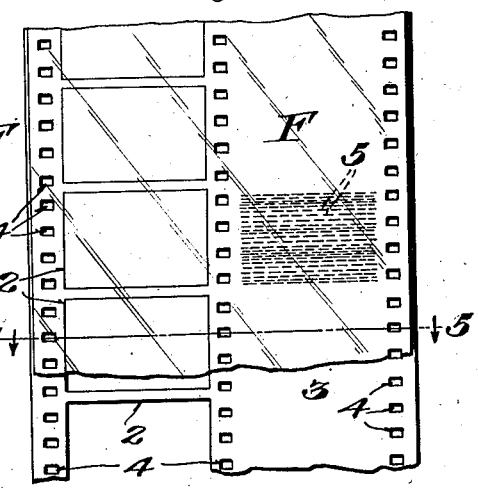
*Fig.3.*
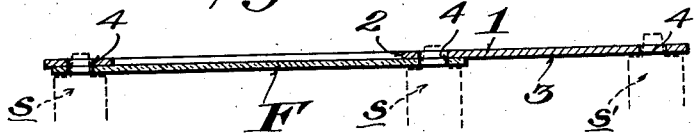
*Fig.5.*
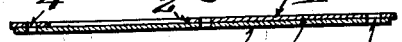
Inventor
Henry C. Bullis,
Witnesses:-

Patented Aug. 7, 1928.

1,679,708

UNITED STATES PATENT OFFICE.

HENRY CHARLES BULLIS, OF WILMINGTON, DELAWARE.

MOTION-PICTURE STRIP.

Application filed December 1, 1926. Serial No. 151,969.

This invention relates to an improvement in film strips used in connection with motion picture machines, and more particularly to a strip including a combined sound and picture record, thus being adapted to produce the so-called talking pictures.

While it has been heretofore proposed to combine a sound and picture record photographically on the same film, it has been difficult to successfully carry out this scheme, chiefly for the reason that different manipulation and treatment of each record is required, in the developing of the picture record and sound record, to obtain the best results, and this is not possible where both records are photographically made on the same film. I have found that where the recording of the sounds is accomplished photographically, the two-film method as set forth in my Patent No. 1,335,651 of March 30, 1920, is the most practical when a photo-electric cell is used to reproduce the sounds, while the separate film method shown in my Patent No. 1,213,150, January 23, 1917, is preferred when it is desired to provide a metallic record of magnetic permeability from a photographic negative. However, it is also practical and desirable to provide a picture strip including a combined picture and sound record, which latter may be reproduced by an electro-magnetic inductive device such as employed in the well-known telegraphophone method.

Therefore, the present invention has primarily in view the provision of a picture strip having combined therewith a metallic sound record medium, whereby the speech sounds accompanying each picture may be accurately recorded together in proper synchronism and syntonism on the same strip, while at the same time providing for reinforcing and strengthening the film strip so that the same is not liable to become broken or torn in use.

Owing to the more or less fragile nature of the usual picture film, they are liable to break or tear, either from ordinary handling or by ruptures received when passing through the exhibiting apparatus.

Therefore, the invention also has as a further object the remedying of this difficulty by providing a celluloid picture strip with a metallic reinforcement thus providing a durable and substantial combined sound and picture record which will not become easily ruptured or broken in use, and which, although embodying metallic reinforcement, may be handled with the same facility as the ordinary celluloid film but with a much greater degree of safety.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:—

Figure 1 is a plan view of a combined picture strip and metallic sound record.

Figure 2 is a longitudinal sectional view thereof taken on the line 2—2 of Figure 1.

Figure 3 is an enlarged cross-sectional view taken on the line 3—3 of Figure 1.

Figure 4 is a plan view of a modified form of the invention.

Figure 5 is a detail cross-sectional view taken on the line 5—5 of Figure 4.

Similar reference characters designate corresponding parts throughout the several figures of the drawings.

A novel and distinctive feature of the present invention resides in providing a sensitized picture strip, preferably of the usual celluloid composition, with a suitable metallic reinforcement which not only provides a substantial body or backing for the said picture strip, but at the same time constitutes a metallic record base which is susceptible of recording a sound wave produced by an electro-magnetic device which inductively records the fluctuations of sounds, in accordance with the well known telegraphophone principle. That is to say, the present invention proposes to combine a picture and sound record, by reinforcing the celluloid picture strip with suitable metallic reinforcement which constitutes a metallic medium susceptible of recording a magnetic sound record, and strengthening the film.

A practical and commercially feasible way of carrying these novel features into effect is illustrated in Figures 1, 2 and 3 of the drawings, wherein it will be observed that I have provided a metallic base 1 preferably in the form of a very thin steel tape or ribbon which is preferably of greater width than the ordinary celluloid picture film strip. This metallic base is provided with an alined series of windows or picture apertures 2 at one side thereof, which are of the same general dimensions as a picture that is recorded on the usual motion picture strip, and is also provided with a metallic sound record margin 3 at one side of the series of alined picture openings. This sound record margin may be of any suitable width, but is preferably of less width than the picture strip as shown in Figures 1, 2, and 3. However, in Figure 4, the sound record margin is shown to be of substantially the same width as the picture strip portion so that the film may be adapted to a margin involving three equally spaced sprockets or a single sprocket having three sets of sprocket teeth. The sound margin 3 is adapted to receive metallic sound striations such as disclosed in my former Patent No. 1,213,150 aforesaid, so that the present film may be used on the same type of machine that is used to reproduce the form of record shown in the patent.

Accordingly, to the embodiment of the invention shown in Figures 1, 2, and 3, the metallic ribbon 1 has secured to one face thereof, by cement or otherwise, a sensitized celluloid picture film F which may extend to a point beyond the middle of intermediate rows of sprocket openings 4, thus leaving the sound margin 3 exposed, or on the other hand, as shown in Figure 4, the celluloid film may extend substantially across the entire width of the ribbon 1 to secure the advantage of a greater attaching area, thus adding to the strength and stability of the strip. This combined metallic backing and film is provided with the triple series of traction openings 4 as shown for engaging the film advancing drums of the reproducing device in the well-known manner. Accordingly, when the sensitized film is attached to the metallic base or support, it will be clear that the same is provided with such reinforcement as will greatly strengthen the film while at the same time providing a metallic record at one side of the picture apertures which is susceptible of recording and reproducing a sound record produced or reproduced by a suitable electromagnetic device. As shown in Figure 3, wherever it is necessary for the sprocket means to engage with the side of the ribbon carrying the film, the sprocket S′ may be made of larger diameter than the sprocket S, to compensate for the relatively stepped cross sectional formation of the ribbon.

As previously indicated, this construction provides a strip which may be readily used with the triple sprocket traction devices used on the machine for reproducing the sound record made in accordance with the method disclosed in my Patent No. 1,213,150. And, in this case, the sound recording device is preferably of such a nature that the sound waves are recorded in a series of transverse lines 5 across the width of the metallic sound record portion 3.

From the foregoing, it will be apparent that regardless of the particular structure utilized in carrying out the invention, the same general principle is involved in each instance. That is to say, in each type of structure shown in the drawings, a sensitized picture film strip is reinforced and supported by a suitable metallic element or elements which extend throughout the length of the film, and which metallic element or elements may be utilized to carry a sound record at one side of the picture recording record, and parallel therewith.

Without further description, it is thought that many features and advantages of the present invention will be readily apparent, and it will also be understood that various changes in the form, proportion, and minor details of construction may be resorted to without departing from the spirit of the invention or scope of the appended claims.

I claim:—

1. A combination sound and picture record strip including a metallic ribbon having a plurality of picture apertures and traction openings on each side thereof, and also having a relatively wide sound recording margin parallel to the picture apertures, said margin also being provided with traction openings at its outer edge, and a film carried by the said ribbon and being substantially co-extensive therewith.

2. A combination sound and picture record strip including a metallic ribbon having a plurality of picture apertures extending partially across the width thereof and bounded on each side by a line of traction openings, the said strip being also provided with a third row of traction openings lying adjacent one edge and the area of the ribbon between the last mentioned traction openings and the traction openings at the inside edge of the picture apertures constituting a relatively wide sound recording zone, and a picture film carried by the metallic ribbon and covering the picture apertures.

3. A combination sound and picture record strip including a metallic ribbon having a plurality of picture apertures and traction openings on each side thereof and at the intermediate portion, said ribbon also having a relatively wide margin parallel to the picture apertures and adapted to receive a magnetic sound record, and a picture film carried by said metallic ribbon and overlying the picture openings therein.

In testimony whereof I hereunto affix my signature.

HENRY CHARLES BULLIS.